United States Patent [19]

Tharman

[11] 4,233,534
[45] Nov. 11, 1980

[54] CONNECTIONS FOR SMALL ENGINE AUXILIARY ELECTRICAL SYSTEM

[75] Inventor: Paul A. Tharman, Milwaukee, Wis.
[73] Assignee: Briggs & Stratton Corporation, Wauwatosa, Wis.
[21] Appl. No.: 962,054
[22] Filed: Nov. 20, 1978

Related U.S. Application Data

[63] Continuation-in-part of Ser. No. 835,448, Sep. 22, 1977, abandoned.

[51] Int. Cl.³ .............................................. H02K 11/00
[52] U.S. Cl. ................................... 310/71; 310/68 D; 339/147 R; 339/DIG. 1
[58] Field of Search ...................... 310/68 R, 71, 70 R, 310/68 D; 174/54, DIG. 8; 339/91 R, 75 R, 75 M, 147 R, 147 P, 94 M, DIG. 1, 258 R; 357/79, 80

[56] References Cited

U.S. PATENT DOCUMENTS

| | | | |
|---|---|---|---|
| 3,290,525 | 12/1966 | Sudmeier | 310/68 R X |
| 3,539,850 | 11/1970 | Sato | 310/71 X |
| 3,851,296 | 11/1974 | Muchmore et al. | 339/94 M X |
| 3,875,438 | 4/1975 | Tharman | 310/68 |
| 4,142,592 | 3/1979 | Brusselmans | 174/DIG. 8 X |

OTHER PUBLICATIONS

Cho-Shrink Heat Shrinkable Connector Boots, Tech. Bull. 33, Chomerics, Inc., Woburn, Mass., Nov. 17, 1969.

*Primary Examiner*—Howard N. Goldberg
*Assistant Examiner*—Eugene F. Desmond
*Attorney, Agent, or Firm*—Quarles & Brady

[57] ABSTRACT

A small engine alternator having a stator with one or a pair of windings which are lead to an unsupported plug element that is engageable with another plug element. A diode rectifier is connected between a lead from the winding and a terminal of the plug element to provide direct current at the plug element. A second winding may be connected to the plug element to provide a.c. current. A piece of heat shrunken plastic tubing extends from the plug element to snugly embrace the lead or leads thereto, and two pieces of heat shrunken plastic tubing may be concentrically arranged to snugly embrace leads to the plug element and a portion thereof. Input leads to battery charging or accessory circuits are connected to terminal members of the cooperating plug element.

10 Claims, 10 Drawing Figures

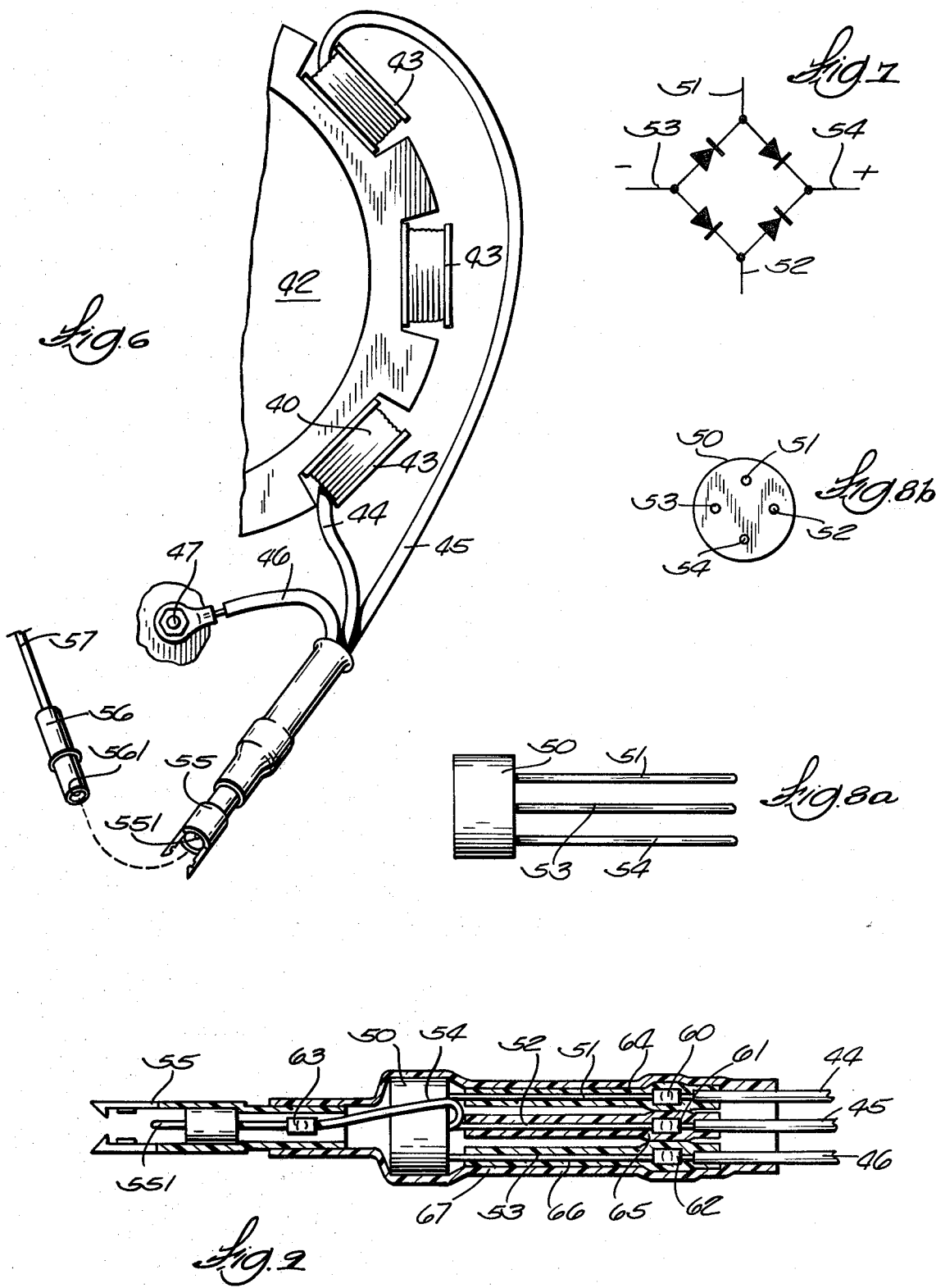

CONNECTIONS FOR SMALL ENGINE AUXILIARY ELECTRICAL SYSTEM

This invention, like that of the pending application Ser. No. 835,448, filed Sept. 22, 1977, now abandoned, of which this is a continuation-in-part, relates to small internal combustion engines that are equipped with alternators, and the invention is more particularly concerned with means on a small internal combustion engine for readily connecting alternator means on the engine with a pair of auxiliary electrical circuits on a machine powered by the engine, to enable one of the auxiliary circuits to be energized with alternating current and the other with unidirectional current, or with a single auxiliary electrical circuit to be energized with unidirectional current.

The general object of the present invention is to provide a small engine auxiliary electrical system generally like that of U.S. Pat. No. 3,875,438 to P. A. Tharman but capable of being produced at substantially lower cost than the system of that patent without sacrificing any of the advantageous features of that system.

Engines of the type with which the invention is concerned are used for powering machines such as riding tractors and riding mowers that are equipped with a storage battery for engine starting and with headlights or other accessories that are normally operated only when the engine is running. The storage battery must be charged with unidirectional current (half-wave or full-wave rectified a.c.), but the other accessories can usually be energized with alternating current. The engine for such a machine has a more or less integral alternator that comprises one or more permanent magnets carried for orbital motion by a rotatably driven shaft of the engine, a magnetically permeable stator core mounted on the engine body adjacent to the magnet orbit, and one or more windings on the core in which alternating current is induced in consequence of magnet motion. Such an alternator has many advantages over a d.c. generator, but when it is employed to energize an electrical system that includes a storage battery, the battery must be charged through a rectifier.

In a system of the type with which the present invention is concerned, the alternator on the engine may have two windings, one of them to supply the a.c. output, the other connected with the storage battery through the rectifier. The battery charging winding has a higher resistance than the a.c. power winding, in order to limit the current through it to a value low enough to ensure that the battery will not be overcharged, thereby eliminating the need for a voltage regulator.

As a practical matter, the rectifier is installed on the engine by the engine manufacturer, who also equips the engine with connector means to which the manufacturer of the powered machine can readily make connections for the auxiliary electrical equipment, so that the engine constitutes, in effect, a unified power package.

The a.c.-d.c. electrical system that preceded the one of U.S. Pat. No. 3,875,438 comprised a full-wave rectifier consisting of four diodes, and it included a fuse that was necessary to protect the battery from burning out in the event the battery was misconnected in its charging circuit. In the system of the patent, a single diode was used, for half-wave rectification, and that diode was mounted in a fuse holder which protected it and also served as a terminal connector for the d.c. load circuit. The fuse holder and an a.c. terminal connector were supported by an L-shaped metal bracket that was mounted on the engine body.

The general object of the invention of U.S. Pat. No. 3,875,438 was the same as that of the present invention, namely to reduce the cost of the sources of alternating and unidirectional current to the lowest attainable minimum, and thus reduce the overall cost of the engine equipped with means to provide those current sources.

At the time the present invention was conceived, engines incorporating the electrical system of U.S. Pat. No. 3,875,438 had been in commercial production by the assignee of that patent for about three years, and about one million such engines had been sold. Competitors of that assignee thus had strong incentive to enter that profitable market with an engine having an auxiliary electrical system that was outside the patent, substantially less expensive, but equally good. Evidently it was not obvious to them how to do so, for no such engine appeared. In any event no improvement upon the system of U.S. Pat. No. 3,875,438 was forthcoming prior to the conception of the present invention.

The significance of this delay is best appreciated from the fact that, as compared with the system of U.S. Pat. No. 3,875,438, that of the present invention achieves a very substantial cost saving—about 12% in the cost of the alternator. It goes without saying that the apparatus of U.S. Pat. No. 3,875,438 never would have been put into production if it had suggested the present invention of those skilled in the art.

In addition to its primary objective of achieving significant savings in the cost of materials and labor, it is an object of the present invention to provide a more versatile arrangement by which connections can be made between auxiliary electrical load circuits on a machine powered by a small engine and a connector on the engine that provides a source of energizing current for the electrical circuits, which arrangement affords greater convenience to the manufacturer of the powered machine because it allows the wiring harness extending to the connector from the loads to be positioned and oriented in various different ways rather than having to be led towards an arbitrary location on the engine body.

Another and more specific object of this invention is to provide a sturdy and compact assembly that comprises one plug element of a quick-disconnect plug connector having male and female elements, a diode or similar component having a pair of terminal conductors that extend in opposite directions from its body, and a pair of conductor leads that extend in a defined direction from a portion of said one plug element, said assembly also comprising very simple means whereby the diode or similar component and its connections with one of the conductor leads are sealingly protected and insulated, and whereby a rigid relationship is maintained between said plug element, the component, and portions of the conductor leads that are rearwardly adjacent to the plug element, such rigidity preventing substantial flexure of the terminal conductors of the component by which they might be broken.

A further object of this invention is to provide a durable and compact assembly comprising a plug element of a quick-disconnect plug connector having male and female plug elements, a full wave rectifier circuits or similar component having a plurality of conductor leads extending from its body rearwardly, one of said conductor leads being connected to a rear portion of said female plug and others to sources of potential, said assembly also comprising means whereby the component and its connections with conductor leads are sealingly protected and insulated, and whereby a rigid relationship is maintained between said plug element, the component, and portions of the conductor leads that extend rearwardly adjacent to the plug element, such rigidity preventing substantial flexure of the terminal conductors of the component of which they might be broken.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate two complete examples of embodiments of the invention constructed according to the best modes so far devised for the practical application of the principles thereof, and in which:

FIG. 6 is a plan view of a portion of a small engine similar to that of FIG. 1, showing windings of an alternator arranged as part of another embodiment of the invention for providing a full-wave d.c. voltage to leads, and means for connecting those leads with load circuits, the last named means being shown in perspective;

FIG. 7 is a diagram of a full-wave bridge rectifier circuit employed in the practice of an embodiment of this invention, employing numerical labels and other indications of the manner in which it may be connected in the diagram of FIG. 6;

Figure 1:
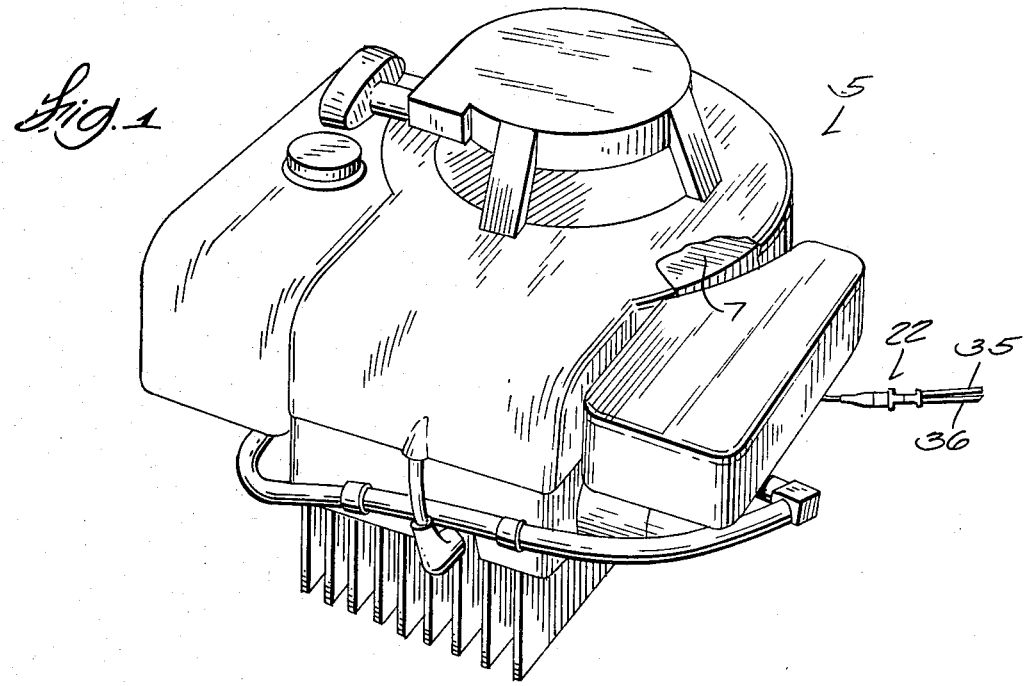
FIG. 1 is a perspective view of a single cylinder engine having apparatus embodying the principles of this invention, providing current sources for auxiliary electrical circuits on a machine powered by the engine and enabling quick connection of those circuits with the current sources.
Figure 2:
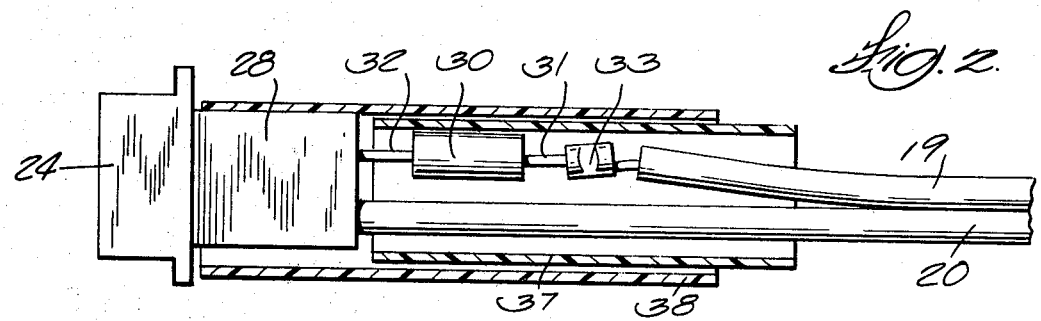
FIG. 2 is a view in longitudinal section of a connector and diode assembly that embodies the principles of this invention, shown at the state in its manufacture at which it is completely assembled but before its heat shrinkable tubing lengths are contracted.
Figure 3:
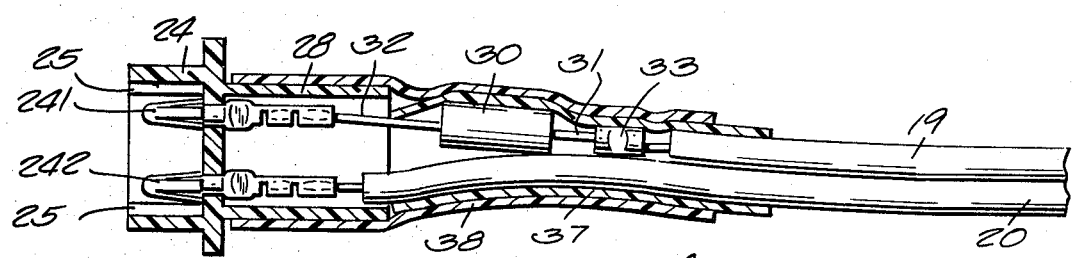
FIG. 3 is a view generally similar to FIG. 2 but showing the assembly in its finished condition.
Figure 4:
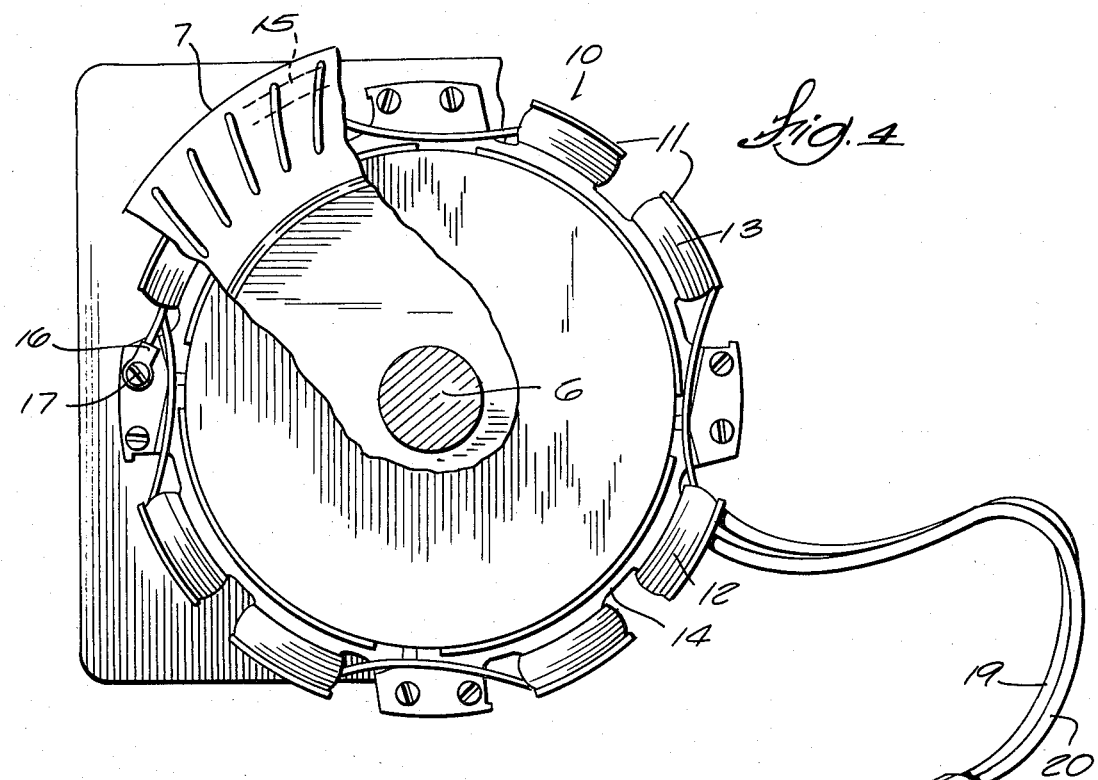
FIG. 4 is a plan view, with substantial portions shown broken away, of that part of a small engine that comprises its alternator, together with the ungrounded leads extending from the alternator and the means for connecting those leads with load circuits, the last named means comprising the assembly of this invention and being shown in perspective.

FIG. 8a is a plan view and FIG. 8b an end view of a commercially available full-wave rectifier showing its appearance for the purpose of enabling a fuller explanation of its use with embodiments of the present invention; and FIG. 9 is a sectional view illustrating details of the construction of a modified embodiment of this invention, with portions of its heat-shrunken tubing broken away and illustrating relations between the plug element and a lead for connecting it with load circuits.

Referring to FIGS. 1–5 of the accompanying drawings, the numeral 5 designates generally the body of a small internal combustion engine such as is used for powering small tractors, riding mowers and similar machines. The crankshaft 6 of the engine projects out of the body and carries a substantially cup-shaped flywheel 7. Secured to the engine body, concentrically with the crankshaft 6 and within the rim of the flywheel 7 is an annular stator core 10 having radially outwardly projecting pole portions 11. Around certain of the pole portions of the stator there are coils that comprise a battery charging winding 12 and an a.c. power winding 13. A plastic sheath 14 on the core 10 insulates the metal of the core from the winding coils and from the wire portions that extend from coil to coil.

Alternating currents are induced in the windings 12 and 13 by one or more permanent magnets 15 mounted in the cylindrical side wall of the flywheel to be carried in orbital motion past the pole portions as the flywheel rotates. The battery charging winding 12 is of lighter gage wire than the a.c. power winding 13 so as to have a higher resistance that limits the current through it to a value low enough to prevent battery over-charging.

Each of the windings 12 and 13 extends about halfway around the stator core 10 and is confined to pole portions at its own side of a diametral line through the core. Each winding has a grounded end and an ungrounded end. The grounded ends of the two windings, which are adjacent to one another at one side of the core, are crimp connected to an eyelet grounding terminal 16 that is secured to the stator core as by means of a screw 17 and is thus electrically grounded to the engine body.

The ungrounded end portions of the two windings 12 and 13 are located adjacent to one another at the diametrically opposite side of the core from their grounded ends, and they are respectively spliced to a d.c. lead 19 and an a.c. lead 20, each comprising an insulated conductor. Preferably the spliced connections are mechanically secured to the sheath 14 in such a manner that they are insulated from the core and from one another, as by gobs of plastic material.

The leads 19 and 20 extend from the stator core towards a generally conventional plug connector 22 that comprises mating male and female plug elements 23 and 24, respectively. Each plug element has a pair of terminal members that are engageable with the terminal members of the other plug element, the terminal members of the male plug element 23 being designated 231 and 232, those of the female plug element 24 being designated 241 and 242. The plug connector 22 is of a type wherein the plug elements are connectable in only one way, so that each terminal member of one plug element always engages only its cooperating terminal member of the other plug element. Such oriented mating can be provided for by means of internal lands 25 in one side of the female plug element, receivable in grooves 26 in the corresponding side of the male plug element, or by otherwise forming the mating portions of the plug element bodies asymmetrically relative to the terminal members.

The body of each of the plug elements extends in a rearward direction away from the other plug element when the two are mated, and the body of one of the plug elements—the female one 24, as shown—has a substantially elongated rear portion 28. Each of the terminal members is insertable into the body of its plug element from the rear thereof, being receivable in a closely fitting bore in the plug element body. A forwardly facing shoulder on each terminal member engages its plug element body to define the forward limit of its insertion, and a radially outwardly biased tang on the terminal member prevents it from backing out of its bore.

The d.c. lead 19 is connected with one terminal member on the female plug element 24 through a rectifier diode 30 that converts the a.c. output of the winding 12 into unidirectional current suitable for battery charging. As is conventional, the diode has terminal conductors 31, 32 that project outwardly from opposite ends of its cylindrical body. One terminal conductor 31 of the diode is secured to the bared free end portion of the d.c. lead 19, preferably by means of a crimp connector 33. The other terminal conductor 32 of the diode is secured to one of the terminal members 241 of the female plug element, the terminal members being adapted for crimp connection to such conductors. The bared free end of the a.c. lead 20 is crimp connected directly to the other terminal member 242 of the female plug element. Normally connections to the terminal members 241 and 242 are made before those terminal members are inserted into the body of the female plug element.

It will be understood that a supply lead 35 for the d.c. load (battery) circuit will be connected to the terminal member 231 of the male plug element 23 and that a supply lead 36 for the a.c. load (headlight) circuit will be connected to the terminal member 232 of the male plug element.

Before the terminal members 241 and 242 are inserted into the female plug element, a length 37 of heat shrinkable plastic tubing is slipped over the leads 19 and 20. In its unshrunken condition this piece of tubing is of a diameter large enough to fit loosely around the two leads but too small to fit arond the body of the plug element. The length of tubing piece 37 can be on the order of 2 inches (5 centimeters).

A second length 38 of heat shrinkable plastic tubing embraces the first tubing piece 37 and the elongated rear portion 28 of the female plug element. The second tubing piece 38 is about as long as the first one, or slightly longer, and in unshrunken condition its diameter is greater than that of the first one and big enough to fit easily around the rear portion 28 of the female plug element.

With the front end of the smaller diameter tubing piece 37 abutting the rear end of the female plug element, and with the front end of the larger diameter tubing piece 38 embracing the rear portion of that plug element, the two lengths of tubing are heated in a known manner to shrink them. They contract circumferentially to a substantial extent, to cause the smaller diameter tubing piece to snugly embrace the diode and substantial portions of the leads 19 and 20 that are near the female plug element while the larger diameter tubing snugly embraces the elongated rear portion of the female plug element and also snugly surrounds the smaller diameter tubing along a substantial portion of the length thereof.

After they are shrunk, the two lengths of plastic tubing protect and insulate the diode 30, its terminal conductors and their connections. The two lengths of tubing also cooperate with one another and with the plug element 37, the diode, and the adjacent end portions of the leads 19 and 20 to form a substantially rigid, unified and sturdy entity, capable of sustaining severe impacts, tensions and other abuses. That unified assembly is nevertheless light and compact, and therefore it can be free-hanging, saving the cost of a bracket or other support for it. Because the plug element 23 is not rigidly supported, it can be readily moved to whatever position will best cooperate with the disposition of the supply leads 35, 36 connected to the male plug element 23.

Figure 5:
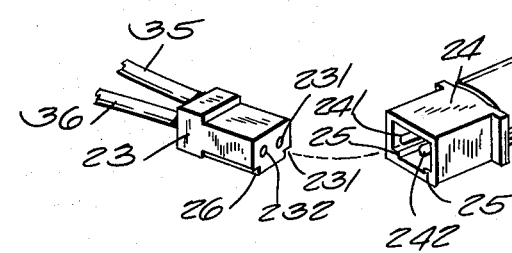
FIG. 5 is a side view of a modified embodiment of the assembly of this invention, with portions of its heat-shrunken tubing shown broken away, illustrated in connected relation to a plug element and leads for connecting it with load circuits.
Figure 5:
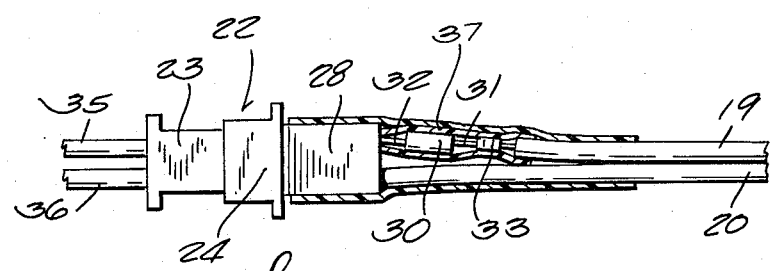

It will be observed that the inner one of the lengths of heat shrunken plastic tubing confines the diode 30 and its bare terminal conductors and connectors against the insulation on the a.c. lead 20. That insulation is preferably a cross-linked polymer, which is tough enough to resist abrasion and penetration by sharp edges on the adjacent metal parts; but, more important, the rigidity and stability that is imparted to the assembly by the plastic tubing lengths confines the diode against motion relative to the adjacent a.c. lead and thus prevents abrasion of the insulation on that lead. Of course, the smaller diameter plastic tube 37 could embrace only the d.c. lead and the diode, as illustrated in FIG. 5, so that there would be a double layer of insulation between the diode connections and the conductor of the a.c. lead; but slipping the inner length of tubing around both of the leads 19 and 20 has been found to be somewhat more convenient and expeditious, in addition to affording slightly greater rigidity to the assembly, and is therefore considered slightly preferable. Either way, the diode connections are protected by a double thickness of tubing against exposure by external abrasion, and the diode as a whole is snugly sealed off from moisture and other foreign matter.

In a second embodiment, not illustrated but generally similar to that of FIGS. 1-5, the length 37 of heat shrinkable tubing is eliminated and only the length 38 of heat shrinkable tubing is employed to fit about the elongated rear portion 28 of the female plug element and leads 19 and 20.

In the embodiment shown in FIGS. 6-9, a single winding 40 is formed of coils wound in series on pole pieces 43 of the stator 42 and includes lines 44 and 45. As the stator rotates, an a.c. voltage is produced in lines 44 and 45 which is applied to the respective terminals 51 and 52 of a full-wave rectifier 50, a typical circuit for which is illustrated in FIG. 7. A commercially available rectifier of the general physical conformation shown in FIGS. 8a and 8b may be used, such as the P/N: WO2M manufactured by General Instrument Corp. of 600 W. John Street, Hicksville, N.Y. (A half-wave diode may also be used if desired). The ground terminal 53 of the rectifier may be coupled through line 46 to ground on a portion of the body of the engine, not shown, by means of a screw 47. The positive output terminal 54 of the rectifier is connected, as indicated in FIG. 9, to the terminal member 551 of the female plug element 55. A male plug element 56 is provided with a contact element 561 to engage the contact element 551 of the socket 55, thereby supplying d.c. potential to the line 57 for use as required.

The lines 44 and 45, the ground line 46 and the contact element 551 may be connected to the respective rectifier terminals 51, 52, 53 and 54 by crimp connectors 60, 61, 62 and 63. However, other connector means may be used if desired.

Referring now to FIG. 9, each of the terminals 51, 52 and 53 together with its crimp connector 60, 61 and 62 and the crimped end of the corresponding lines 44, 45 and 46 is encased in a length 64, 65 and 66, respectively, of fiberglass tubing, each of which may be placed over lines 44, 45 and 46 before the crimp connectors are fastened in place and then slid into position abutting the terminal end of the rectifier body. These pieces of tubing are of a diameter large enough to fit around each of the leads and each associated crimp connector, as indicated, but too small to fit around the body of the rectifier. The length of the tubing pieces may be of the order of 2 inches, or 5 centimeters. A single piece of tubing may be used to enclose a group of elements, as indicated by 37 in FIG. 2, without departing from the principles of the invention. As another alternative, the tubing pieces 64, 65 and 66 may be lengths of heat shrinkable plastic tubing.

A tubing element 67 of larger diameter, of heat shrinkable plastic tubing is positioned to cover a portion of the female plug element 55, the body of the rectifier 50, and extend over the tubing pieces 64, 65 and 66. The element 67 is preferably but not necessarily longer as well as of larger diameter than the first pieces so that it will extend beyond both ends of the first pieces.

With the front ends of the lengths 64, 65 and 66 of tubing abutting against the body of the rectifier 50 and with the tubing element 67 embracing a portion of the female plug element 55, the body of the rectifier 50 and the lengths 64, 65 and 66 of tubing, the tubing element 67 is heated in a well known manner to cause it to shrink. The element 67 contracts circumferentially so that it snugly embraces the rear portion of the female plug element 55, the body of the rectifier 50, the lengths 64, 65 and 66, and the ends of the lines 44, 45 and 46, as shown in FIG. 9.

From the foregoing description taken with the accompanying drawings it will be apparent that this invention provides improvements in an auxiliary electrical system for a small internal combustion engine, of the general type disclosed in U.S. Pat. No. 3,875,438, wherein one or a pair of windings on an alternator stator are lead to a plug element which is free and supported. Heat shrink tubing elements are employed to provide structural rigidity to the supported plug element. A substantial cost reduction is thus achieved as compared with the arrangement of that patent but without sacrifice of any of the features or advantages of that prior arrangement.

Those skilled in the art will appreciate that the invention can be embodied in forms other than as herein disclosed for purposes of illustration.

I claim:

1. In combination with an internal combustion engine of the type adapted to power a machine and to provide a source of energization for auxiliary electrical equipment on the machine comprising an a.c. load circuit and one requiring unidirectional current, said engine having permanent magnet means carried by a part of the engine that rotates when the engine is running and a pair of alternator windings mounted on the engine body for cooperation with the permanent magnet means, one end of one alternator winding being connected with an a.c. lead, one end of the other alternator winding being connected with a d.c. lead, and the other ends of the alternator windings being grounded to the engine body, means on the engine providing for connection of said leads with the machine load circuits and for rectification of current to be fed to the d.c. load circuit, the last mentioned means comprising:

A. a plug element of a quick-disconnect connector comprising male and female elements, each of which has a pair of terminal members that are cooperable with the terminal members of the other plug element, one of said plug elements having a body portion, the a.c. lead being secured to one of the terminal members of the body portion;

B. a diode having a pair of oppositely projecting terminal conductors,
  (1) one of said terminal conductors being connected to the d.c. lead, and
  (2) the other of said terminal conductors being connected to the other of said pair of terminal members of said plug element to dispose the diode and its adjacent portion of the d.c. lead in projecting relation to said body portion and alongside the a.c. lead;

C. a first length of heat shrunken plastic tubing extending from said body and snugly embracing the diode and a substantial length of the d.c. lead adjacent to the diode; and D. a second length of heat shrunken plastic tubing snugly embracing said body portion of said plug element and extending a substantial distance therefrom in snugly surrounding relationship to the diode, substantial portions of the a.c. and d.c. leads, and the first length of heat shrunken plastic tubing, and cooperating with said first length of tubing to insulate and protect the diode and its connections and to form a rigid, sturdy, unified assembly with the diode, said plug element and adjacent portions of said leads.

2. The combination of claim 1 wherein said plug element is asymmetrical in relation to its terminal members so that it can be connected with its cooperating plug element in only one way to preclude misconnection of the leads with the respective load circuits to be fed from them.

3. In combination with an internal combustion engine for powering a machine that has a pair of auxiliary electrical load circuits, one of which requires alternating current and the other of which requires unidirectional current, said engine having permanent magnet means carried by a part on the engine that rotates when the engine is operating and having a pair of alternator windings mounted on its body for cooperation with the permanent magnet means to provide for energization of said load circuits, one end of one alternator winding being connected with an a.c. lead and one end of the other alternator winding being connected with a d.c. lead, and the other end of each alternator winding being grounded to the engine body, means providing for connection of said leads with auxiliary load circuits and for rectification of current fed to said other load circuit, the last mentioned means comprising:

A. a diode rectifier having a pair of oppositely projecting conductor terminals, one of which is connected with the d.c. lead;

B. a quick-disconnect plug connector comprising cooperating male and female plug elements each having a pair of terminal members that are engageable with the terminal members of the other plug element, one of said plug elements having a body portion that extends a substantial distance in a defined direction,
  (1) the other conductor terminal of the diode being connected to one of the terminal members of said one plug element,
  (2) the a.c. lead being connected with the other terminal member of said one plug element, and
  (3) said plug elements being arranged to fit together in only one way so that auxiliary load circuits can be properly energized when input conductors for the auxiliary load circuits are connected with the respective terminal members of the other plug element;

C. a first length of heat shrunken plastic tubing extending from the body portion of said one plug element, embracing the diode and a substantial length of the d.c. lead adjacent thereto; and D. a second length of heat shrunken plastic tubing snugly embracing part of the body portion of said one plug element and extending a substantial distance therefrom to also snugly embrace the first length of tubing, the diode, and substantial portions of said leads, thereby cooperating with said first length of tubing to protect and insulate the diode and its connections and to support the diode and its adjacent portions of said leads in rigid relation to said one plug element.

4. The combination of claim 3 wherein said first length of heat shrunken plastic tubing snugly embraces the a.c. lead as well as the diode and said length of the d.c. lead.

5. In combination with an internal combustion engine adapted to provide a source of energization for electrical equipment associated with the engine, including a d.c. load circuit requiring unidirectional current, said engine having permanent magnet means carried by a part of the engine that rotates when the engine is running and an alternator winding mounted on the engine body for cooperation with the permanent magnet means, the alternator winding being connected via wiring means to supply a.c. power to means providing for rectification of current to be fed to the d.c. load circuit, the last mentioned means comprising:

A. a female plug element of a quick-disconnect plug connector comprising male and female plug elements, each of which has a terminal member that is cooperable with the terminal member of the other plug element, said female plug element having a body portion that extends a substantial distance in a defined direction;

B. a rectifier having a plurality of terminal conductors,
(1) a first one of said terminal conductors being connected to the wiring means to receive a.c. power, and
(2) a second one of said terminal conductors being connected to the terminal member of said female plug element to dispose the rectifier and the adjacent portion of the wiring means in projecting relation to the said body portion;

C. a length of tubing extending from said body portion and embracing a part of the rectifier including its first terminal conductor and a substantial length of the adjacent wiring means; and D. a length of heat shrunken plastic tubing snugly embracing said body portion of said plug element and extending a substantial distance therefrom in snugly surrounding relationship to the second terminal conductor, the rectifier body and the said length of tubing, and cooperating with said length of tubing to insulate and protect the rectifier and its terminal conductors and to form a rigid, unified, unsupported assembly of the rectifier, said plug element and adjacent portions of said conductor and wiring means.

6. In combination with an internal combustion engine of the type having an alternator including a stator that has at least one winding, means on the engine providing for connection of said winding with machine load circuits, the last mentioned means including:

A. a quick-disconnect plug element cooperable with a mating plug element, said first recited plug element also including a body portion and terminal members;

B. diode means for rectification of alternating current to direct current and including terminal conductors,
(1) at least one of said terminal conductors being connected to a lead from said winding, and
(2) at least one other of said terminal conductors being connected to a terminal member of said plug element;

C. a first length of tubing snugly embracing the diode means and a portion of the lead thereto to insulate and protect the diode means and its connections; and D. a second length of heat shrunken plastic tubing snugly embracing part of said body portion of said plug element, the first length of tubing, and a portion of the lead connected to the diode to insulate and protect the diode means and its connections and to form a rigid, unified plug assembly.

7. The combination of claim 6 wherein: said diode means is a full-wave rectifier and the winding has two leads connected to terminal conductors thereof, and both of said leads are embraced within said second length of heat shrunken plastic tubing.

8. The combination of claim 7 wherein: each lead to said diode means is enclosed in a separate length of fiberglass tubing arranged within the second length of heat shrunken plastic tubing.

9. The combination of claim 7 wherein: each lead to said diode means is enclosed in a separate length of heat shrunken plastic tubing arranged within the second length of heat shrunken plastic tubing extending from the plug element.

10. The combination of claim 6 wherein the stator includes a second winding,
a lead from the second winding is connected to another terminal member of said plug element to provide a source of a.c. current at the plug element, and
said second length of heat shrunken plastic tubing embraces both the diode means and the lead thereto and a portion of the lead from the second winding.

* * * * *